US008612480B2

(12) United States Patent
Wooldridge et al.

(10) Patent No.: US 8,612,480 B2
(45) Date of Patent: Dec. 17, 2013

(54) PERMITTING UTILIZATION OF COMPUTER SYSTEM RESOURCES IN ACCORDANCE WITH THEIR LICENSING

(75) Inventors: James L. Wooldridge, Fall City, WA (US); James J. Bozek, Bothell, WA (US); Robert E. Stephens, Snoqualmie, WA (US)

(73) Assignee: International Business Machines Corporation, Armonk, NY (US)

( * ) Notice: Subject to any disclaimer, the term of this patent is extended or adjusted under 35 U.S.C. 154(b) by 1935 days.

(21) Appl. No.: 10/971,256

(22) Filed: Oct. 23, 2004

(65) Prior Publication Data

US 2006/0100962 A1    May 11, 2006

(51) Int. Cl.
*G06F 7/00* (2006.01)
*G06F 17/30* (2006.01)

(52) U.S. Cl.
USPC .............. 707/781; 707/737; 707/999.009

(58) Field of Classification Search
None
See application file for complete search history.

(56) References Cited

U.S. PATENT DOCUMENTS

| 5,553,143 | A | * | 9/1996 | Ross et al. ................ 705/59 |
| 6,105,069 | A |   | 8/2000 | Franklin et al. |
| 6,237,786 | B1 | * | 5/2001 | Ginter et al. .............. 213/153 |
| 6,662,284 | B2 | * | 12/2003 | Gold ......................... 711/163 |
| 6,832,358 | B2 | * | 12/2004 | Foster et al. ................ 716/4 |
| 6,889,212 | B1 | * | 5/2005 | Wang et al. ................. 705/59 |
| 7,165,041 | B1 | * | 1/2007 | Guheen et al. .............. 705/26 |
| 2001/0013024 | A1 | * | 8/2001 | Takahashi et al. .......... 705/59 |
| 2001/0013099 | A1 | * | 8/2001 | Haruki ....................... 713/202 |
| 2002/0019977 | A1 | * | 2/2002 | Matsuzuki .................. 717/170 |
| 2002/0107803 | A1 | * | 8/2002 | Lisanke et al. .............. 705/51 |
| 2002/0188704 | A1 | * | 12/2002 | Gold et al. .................. 709/221 |
| 2003/0007473 | A1 | * | 1/2003 | Strong et al. ............... 370/338 |
| 2003/0069828 | A1 |   | 4/2003 | Blazey et al. |
| 2003/0071900 | A1 |   | 4/2003 | Aoyagi |
| 2004/0107125 | A1 | * | 6/2004 | Guheen et al. ............... 705/7 |
| 2005/0038752 | A1 | * | 2/2005 | Gaetano et al. ............. 705/59 |

OTHER PUBLICATIONS

EPO office action in corresponding EPO patent application 06 830 284.3-1243, dated Mar. 3, 2009.
K. Bain et a., "Introducing Microsoft Virtual Server 2005 on IBM eserver xSeries Servers," Nov. 2004.
TechRepublic Guided Tour: Terminal Services Manager under Windows Server 2003, Internet web site http://articles.techrepublic.com/5102-6345-5208163.html, May 17, 2004.

* cited by examiner

*Primary Examiner* — Azam Cheema
(74) *Attorney, Agent, or Firm* — Thomas Tyson (57) ABSTRACT

Permitting utilization of computer system resources in accordance with the licensing thereof is disclosed. A method includes conducting an inventory of the resources of a computer system. The method determines which of the resources of the computer system are licensed for current usage, and permits utilization of these resources. Other resources of the computer system that are not licensed for usage are prevented from being used. The method may include determining which resources are licensed for usage with metering. The method permits the utilization of such resources, and tracks utilization availability of these resources. The method may further include determining which resources are licensed for periodic usage. Once the method receives indication to allow the periodic usage of these resources, the method permits their utilization, and tracks their utilization availability as needed. Preferably, the method performs its functionality without rebooting or restarting the computer system.

15 Claims, 5 Drawing Sheets

PERMITTING UTILIZATION OF COMPUTER SYSTEM RESOURCES IN ACCORDANCE WITH THEIR LICENSING

FIELD OF THE INVENTION

The present invention relates generally to permitting and preventing utilization of computer system resources, and more particularly to permitting utilization of computer system resources that are licensed for usage and preventing utilization of computer system resources that are not licensed for usage.

BACKGROUND OF THE INVENTION

Computer system resources include processors, memory, and other types of computer system resources. Processors are the computing parts of computer systems, and execute instructions in accordance with computer programs. Memory is the workspace of a computer system, from which computer programs are typically executed, and to which data processed by the computer programs is stored. Memory is usually volatile in nature, such that it loses its contents once power is removed from the memory.

Traditionally, computer system resources like processors and memory have been purchased or leased by an organization. For example, an organization may determine that it needs a number of computer systems, each having a certain number of processors and a certain amount of memory. Once the needs of the organization are determined, the organization then purchases or leases the computer systems as configured from a provider.

However, the computer system needs of an organization can increase over time, or may fluctuate over time. For instance, an organization may determine that the number of processors for each of its computer systems that the organization needs will increase over a two-year period. As another example, an organization may determine that it needs more computing power—that is, more processors for its computer systems—to meet seasonal demands, and at other times needs less computing power, and thus less processors for its computer systems. For instance, an accounting organization may need additional computing power in the months preceding national tax deadlines, and may need less computing power during other times of the year.

Computer system resource management, however, has historically been insufficient to meet the changing computer system needs of an organization. An organization may have to purchase or lease new computer systems, or add new resources to existing computer systems, as its needs increase over time. Where an organization's computer system needs fluctuate over time, an organization may have to temporarily add additional resources to existing computer systems, or temporarily lease additional computer systems, to satisfy its temporary needs.

In each of these situations, significant time and expense may be expended to integrate the new computer systems with the existing computer systems, or to add the additional resources to the existing computer systems. Definitely in the latter case, and usually in the former case, the existing computer systems may have to be shutdown and/or rebooted to reflect the changes that have been made to the computer systems of an organization. Furthermore, once the added computer systems or computer system resources are no longer needed, removal may cause additional downtime to reconfigure the computer systems that will remain.

In other words, adding additional computer systems, or adding additional resources to existing computer systems, can be a time-consuming and expensive proposition. Especially where such additional computer systems or resources are needed only on a temporary basis, organizations may determine that it is more prudent to just purchase or lease sufficient computer systems or computer system resources to meet their peak demands, even though some of the systems or resources may not be needed for most of the time, or for long periods of time. Similarly, an organization assessing its projected computer system needs over a three year period, with needs increasing each year, may determine that it is more prudent to purchase or lease all of the needed computer systems or resources at the beginning of the period, instead of adding computer systems or resources as needed throughout the period.

In each of these situations, organizations thus end up purchasing or leasing more computational power than they currently need, with some computer systems or computer system resources not being needed now, because of the time and expense required to perform upgrades later and potentially to remove those upgrades later. However, purchasing or leasing more computer systems or resources than is currently needed is nevertheless wasteful from an expense standpoint. For these and other reasons, therefore, there is a need for the present invention.

SUMMARY OF THE INVENTION

The invention relates to permitting utilization of computer system resources in accordance with the licensing thereof. A method of the invention includes conducting an inventory of the resources of a computer system. The method determines which of the resources of the computer system are licensed for current usage, and permits utilization of these resources. Other resources of the computer system that are not licensed for usage are prevented from being used.

For instance, the method may include determining which resources are licensed for usage with metering, where metering can mean that an organization pays for the time during which such a resource is on and capable of being used, and not prevented from being used. The method permits the utilization of such resources, and tracks utilization availability of these resources, in that it tracks the length of time during which such a resource is on and capable of being used, and not prevented from being used.

Furthermore, the method may include determining which resources are licensed for periodic usage, such that the resources may be on and capable of being used for a specific period of time. These resources may initially be part of the resources that are not licensed for current usage, in that they are initially not being used, and are prevented from being used. Once the method receives indication to allow the periodic usage of these resources, the method permits their utilization, and tracks their utilization availability as needed.

Another method of the invention conducts an inventory of the resources of a computer system, where the resources include at least processors and/or memory. Each resource is one of at least five licensing types: a resource that is licensed for anytime usage without metering; a resource that is licensed for anytime usage with metering; a resource that is licensed for periodic usage without metering; a resource that is licensed for periodic usage with metering; and, a resource that is not currently licensed. The method stores the inventory of the resources within a secure location of the computer system.

Furthermore, for each resource that is not currently being used, the method performs one of two actions. Where the resource is memory, the memory is placed in a list of unregistered memory to prevent its usage within the computer system. Where the resource is a processor, the processor is placed in a lowest power state, and its usage by the computer system is prevented. The licensing type of each resource can change as needed.

A computer system of the invention includes a number of resources, such as memory and/or processors. Each resource has one of the five licensing types as delineated above. The computer system further includes a mechanism to dynamically manage, enable, and disable usage of the resources in accordance with the licensing thereof, without rebooting the computer system. Thus, resources that are licensed for periodic usage can be brought online and sent offline as needed, without rebooting the computer system. Resources that are not currently licensed may have their licensing type, or status, updated, and be brought online as needed, again without rebooting the computer system.

An article of manufacture of the invention includes a computer-readable medium and means in the medium. The medium may be a recordable data storage medium, a modulated carrier signal, or another type of computer-readable medium. The means is for dynamically managing usage and licensing of the resources of a computer system without rebooting the computer system. As before, each resource has one of the five licensing types delineated above.

Embodiments of the invention provide for advantages over the prior art. An organization may be provided with computer systems that have sufficient resources as needed for peak time usage, and/or as projected as needed over a period of time into the future. However, the organization does not purchase or lease all of the computer system resources, but rather only licenses the resources that it currently needs for anytime usage, either with or without metering. The other resources of the computer systems, even though present, are not able to be used by the organization. When or as the organization needs additional computer system resources, either on a periodic (i.e., seasonal) or permanent basis, it is able to license and/or use these resources, with or without metering. Such resources are then brought online, and enabled to be used, without rebooting of the computer systems.

Therefore, an organization does not have to purchase or lease computer system resources that it may need in the future, or that it may need periodically, but that it does not currently need. As its needs change or increase, the organization is able to update its licensing and usage of computer system resources so that the resources available for usage are more closely aligned with the organization's needs. In other words, embodiments of the invention provide for on-demand computing, so that an organization can obtain and pay for only the computer system resources it currently needs, without having to reconfigure or reboot its computer systems.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
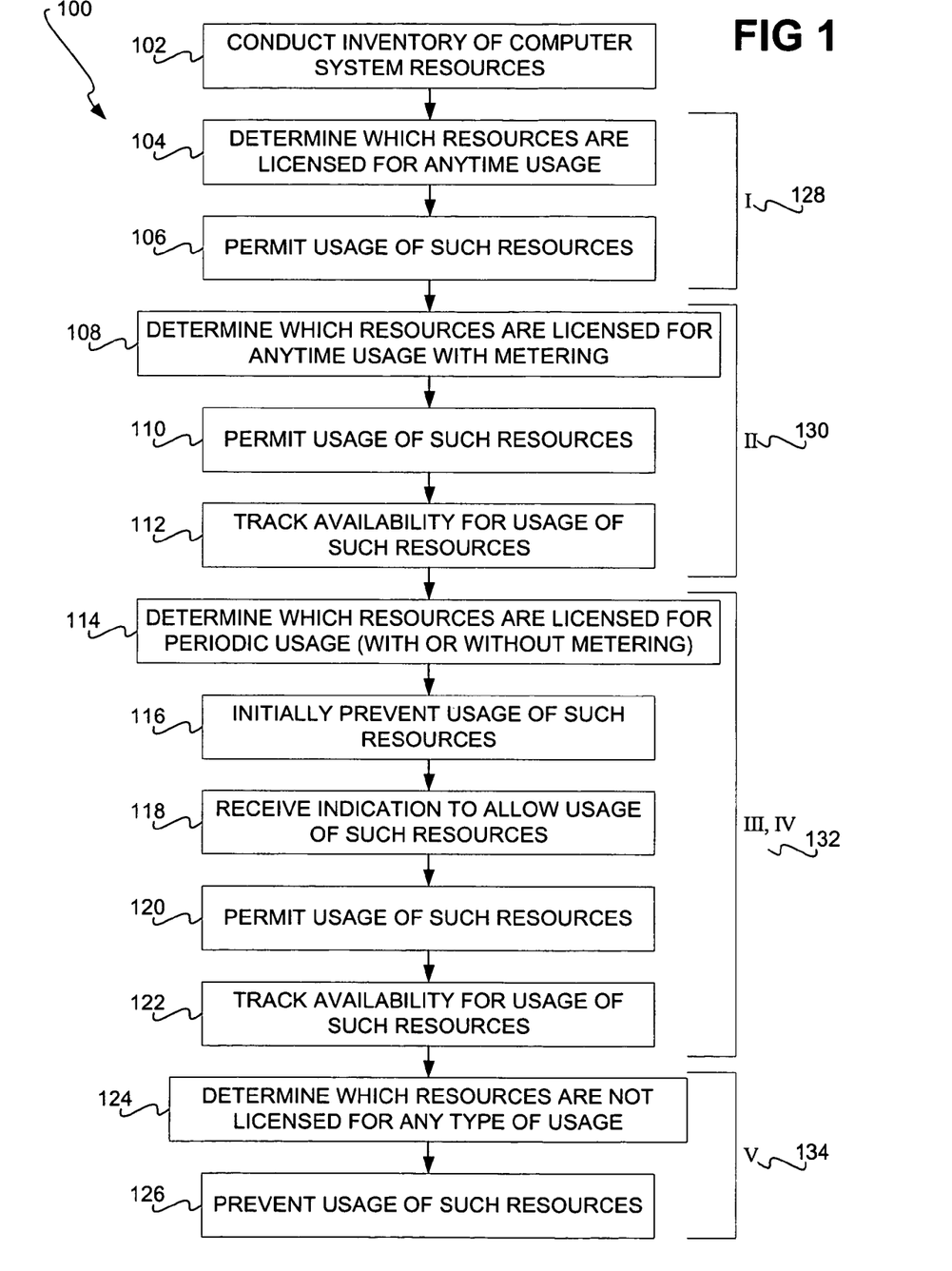
FIG. 1 is a flowchart of a method for permitting utilization of computer system resources in accordance with licensing thereof, according to an embodiment of the invention, and is suggested for printing on the first page of the issued patent.

FIG. 1 shows a method 100 for managing, or permitting utilization of, computer system resources in accordance with licensing thereof, according to an embodiment of the invention. Like other methods of embodiments of the invention, the method 100 may be implemented as one or more computer programs stored on a computer-readable medium of an article of manufacture. The computer-readable medium may be a recordable data storage medium, a modulated carrier signal, or another type of computer-readable medium.

The method 100 conducts an inventory of the resources of a computer system (102). For example purposes, these resources are described herein as including memory and processors. However, embodiments of the invention are amenable to implementation in relation to other types of computer system resources, in addition to and/or in lieu of processors, such as hard disk drives and other types of permanent and/or removable storage, slots receptive of hardware cards, and so on. Processors are the computing parts of computer systems, and execute instructions in accordance with computer programs. Memory is the workspace of a computer system, from which computer programs are typically executed, and to which data processed by the computer programs is stored. Memory is usually volatile in nature, such that it loses its contents once power is removed from the memory.

The resources are those that have been installed within the computer system. However, as will be described, the resources are not necessarily utilizable within the computer system unless and until they have appropriately licensed. As such, initially not all of the resources may be licensed for usage. When further computer resources are needed, they can therefore be licensed and made available for usage without requiring the computer system to be shut down and rebooted. That is, the computer resources can be made available for usage without having to install them in the computer system, since they are already installed.

In one embodiment of the invention, the resources of a computer system can be divided into five different types, based on the licensing thereof by an organization from a provider. The organization can be considered the user of the computer system resources, where the provider is the entity which provides the resources to the organization, and from which the organization may license the resources. These five different licensing types of resources include: resources that are licensed for anytime usage without metering; resources that are licensed for anytime usage with metering; resources that are licensed for periodic usage without metering; resources that are licensed for periodic usage with metering; and, resources that are not currently licensed. It is noted that resources can have their licensing type changed, without rebooting, restarting, or shutting down of the computer system.

Resources that are licensed for anytime usage without metering may be considered as the permanent resources of the computer system. That is, such computer system resources are always available for use by the organization, and the organization does not pay for the time during which those resources are available for usage. By comparison, resources that are licensed for anytime usage with metering may be considered resources that are available for use by the organization, but for which the organizations pays for the time during which these resources are available for usage. As such, the organization may turn on and turn off such resources as needed, such that when the resources are on, they are online and available for usage, and when the resources are off, they are offline and not available for usage.

Resources that are licensed for periodic usage may be so licensed with or without metering. Periodic usage resources are resources that are licensed for seasonal or periodic usage. For instance, an organization may license such resources so that they are or can be online and available for usage during the months of January, February, and March, and are offline and not available for usage during the other months of the year. These resources may be licensed with or without metering. For example, if a resource is licensed for periodic usage with metering, during the period the resource can be available for usage, the organization is charged only when the resource is actually made available for usage, and is otherwise not charged.

Still referring to FIG. 1, the method 100, of the computer system resources within the inventor, which computer system resources are licensed for anytime usage without metering (104). The method 100 permits the usage of these resources (106), so that they are available for usage within the computer system, by the organization. The Roman numeral I, indicated by the reference number 128, denotes that these resources are of a first licensing type, licensed for anytime usage without metering.

The method 100 next determines which computer system resources are licensed for anytime usage with metering (108). The method 100 permits the usage of these resources (110), so that they are available for usage within the computer system, by the organization. However, the method 100 further tracks the usage availability of these resources (112), so that the organization can be charged for the length of time in which each such resource is available for usage. The Roman numeral II, as indicated by the reference number 130, denotes that these resources are of a second licensing type, licensed for anytime usage with metering.

The method 100 then determines which computer system resources are licensed for periodic usage, either with or without metering (114). The method 100 initially prevents the usage of these resources (116), so that they are not available for usage within the computer system by the organization. Once the method 100 receives an indication to allow usage of these resources (118), it permits the resources to be used (120). The indication may be from a calendar event corresponding to the start date at which the resources are able to be used, for instance, or from manual starting by a user.

The usage availability of these resources is further tracked (122). When the period during which the resources are able to be used has expired, the resources are again prevented from being used. Furthermore, in the particular case of periodic usage resources with metering, the time during which these resources are available for usage is tracked so that the organization can be appropriately charged. The Roman numerals III and IV, as indicated by the reference number 132, denote that these resources are of a third and a fourth licensing types, licensed for periodic usage with or without metering.

Finally, the method 100 determines which computer resources of its inventory are not licensed for any type of usage (124). The method 100 prevents the usage of these resources (126). The Roman number V, as indicated by the reference number 134, denotes that these resources are of a fifth licensing time, not licensed for current usage. For example, such resources may include resources that the organization may want to use in the future, as anytime or periodic usage resources with or without metering. Therefore, the organization may at some time in the future license these resources for usage. At that time, these resources would have their licensing type changed or updated, and the organization would be permitted to use them in accordance with their updated licensing type.

Technical Background

Figure 2:
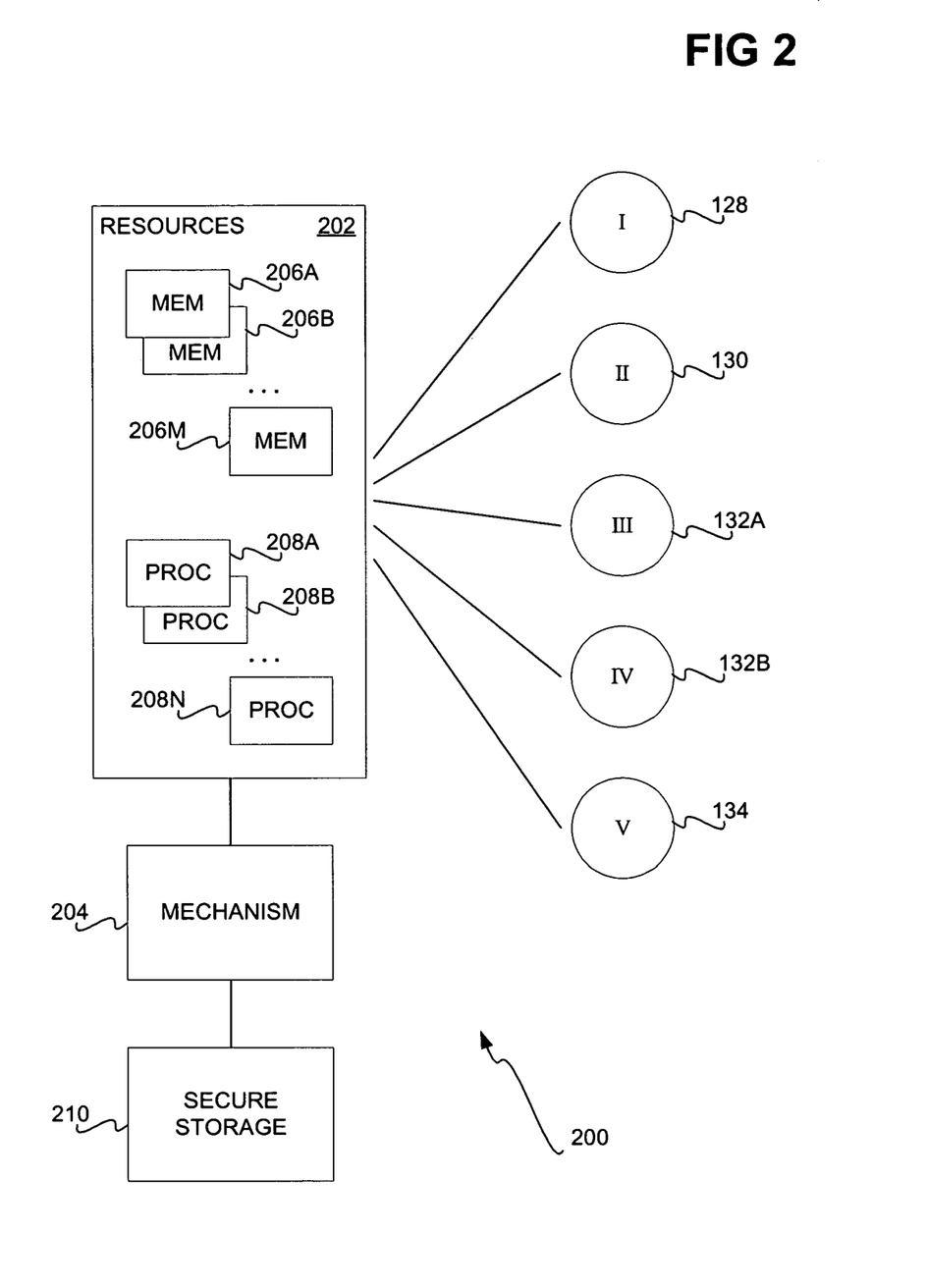
FIG. 2 is a diagram of a computer system having resources like processors and memory, according to an embodiment of the invention.

FIG. 2 shows a computer system 200, according to an embodiment of the invention. The computer system 200 may be or include a desktop computer, a server computer, a client computer, a laptop computer, and/or a notebook computer. The computer system 200 is depicted in FIG. 2 as including resources 202, a mechanism 204, and a secure storage 210. However, as can be appreciated by those of ordinary skill within the art, the computer system 200 may have components in addition to and/or in lieu of the resources 202, the mechanism 204, and the secure storage 210. The resources 202 are depicted in FIG. 2 as including memory 206A, 206B, . . . , 206M, collectively referred to as the memory 206, as well as processors 208A, 208B, . . . , 208N, collectively referred to as the processors 208. As can be appreciated by those of ordinary skill within the art, the computer system 200 may have resources in addition to and/or in lieu of the memory 206 and the processors 208.

Each of the resources 202, such as each of the memory 206 and each of the processors 208, has assigned thereto a licensing type, as one of the licensing types represented by the Roman numerals I, II, III, IV, and V, as denoted by the reference numbers 128, 130, 132A, 132B, and 134, respectively. As has been described, the licensing type represented by the Roman numeral I includes resources that are licensed for anytime usage without metering. The licensing type represented by the Roman numeral II includes resources that are licensed for anytime usage with metering. The licensing type represented by the Roman numeral III includes resources that are licensed for periodic usage without metering, whereas the type represented by the Roman numeral IV includes resources that are licensed for periodic usage with metering. Finally, the licensing type represented by the Roman numeral V includes resources that are not currently licensed. It is noted that resources can have their licensing type changed, without rebooting, restarting, or shutting down of the computer system.

The mechanism 204 can be or include hardware, software, or a combination of hardware and software. For instance, the mechanism 204 may be or include the kernel of the operating system running on the computer system 200. The mechanism 204 specifically manages, enables, and disables the usage and/or the licensing of the resources 202 in accordance with their licensing, without rebooting of the computer system 200. Such management, enablement, and disablement is dynamic in that any of the resources 202 may have its licensing type changed among the licensing types represented by the Roman numerals I, II, III, IV, and V.

The manner by which the mechanism 204 manages, enables, and disables the usage and/or the licensing of the resources 202 in one embodiment is by performing the methods of embodiments of the invention described herein, such as the method 100 of FIG. 1 that has been described. Management of the usage and/or licensing of the resources 202 can include storing and updating the licensing type of each of the resources 202, as well as tracking the length of time in which each of the resources 202 has been available for usage, if necessary. Enablement and disablement of the usage and/or licensing of the resources 202 can include making the resources 202 available or unavailable for usage in accordance with their licenses.

The mechanism 204 stores information regarding the licensing and usage of the resources 202 in a secure storage 210 in one embodiment of the invention. The secure storage 210 may be non-volatile, persistent storage, such as flash memory or a hard disk drive. The storage 210 is secure in that other components of the computer system 200 may not be able to modify, read, write, or delete the contents of the storage 210 without going through the mechanism 204. Therefore, the mechanism 204 can be assured that the information stored in the secure storage 210 has not been tampered. The types of information that the mechanism 204 stores in the secure storage 210 include the licensing type of each of the resources 202, as well as, for periodic usage resources and for resources that are metered, the length of time the resources 202 have been made available for use, for accounting purposes.

Example Specific Implementation

Figure 3:
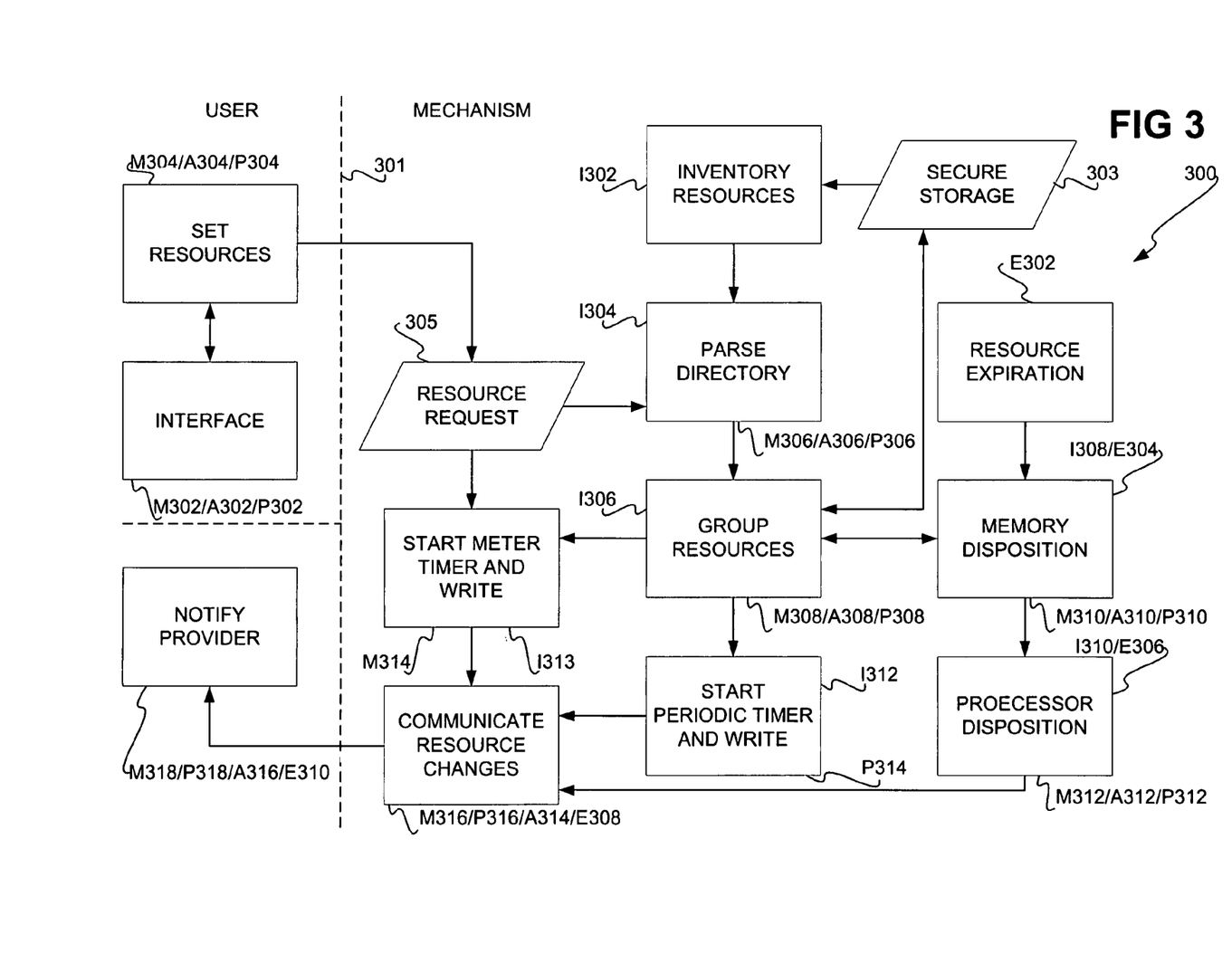
FIG. 3 is a flowchart of a method for permitting utilization of computer system resources in accordance with licensing thereof, which is more detailed than but consistent with the method of FIG. 1, according to an embodiment of the invention.

FIG. 3 shows a flow diagram of a method 300 for managing usage availability of computer system resources in accordance with their licensing, according to an embodiment of the invention. The method 300 is consistent with but more detailed than the method 100 of FIG. 1. The method 300 may be performed by the mechanism 204 in one embodiment of the invention, and in relation to the computer system 200. Parts of the method 300 are performed by a user of an organization to which the computer system 200 was provided by a provider, and other parts of the method 300 by the mechanism 204, as indicated by the dotted line 301.

The actual steps or acts of the method 300 are indicated by reference numbers prefixed by the letters I, M, A, P, or E, to indicate when and in what order these steps or acts are performed. The reference numbers prefixed by the letter I are performed in numerical order at initialization. The reference numbers prefixed by the letter M are performed in numerical order when the user initiates a request for a metered usage resource. Likewise, the reference numbers prefixed by the letters A and P are performed in numerical order when the user initiates a request for an anytime usage resource and a request for a periodic usage resource, respectively. Finally, the reference numbers prefixed by the letter E are performed in numerical order when a metered and/or periodic usage resource has expired.

At initialization, an inventory of the resources of the computer system is conducted (I302) into a directory. This directory is parsed (I304), so that the method 300 determines the licensing type of each computer system resource. Like-licensing type resources are grouped together (I306), and the directory is stored in secure storage 303, which may be the secure storage 210 of FIG. 2 in one embodiment of the invention. For memory resources that are not currently available for usage, such memory is disposed so that its use is prevented (I308). Disposition of memory resources can include placing the memory in a list of unregistered memory, to prevent the memory from being allocated within the computer system. Such memory is capable of being transferred to a pool of registered memory for active utilization by the computer system, without rebooting. That is, such memory can have its licensing type changed or otherwise can begin to be used without rebooting of the computer system. Thus, memory that is not currently being used can begin to be used without rebooting.

For processor resources that are not currently available for usage, such processors are disposed that their use is prevented (I310). Disposition of processor resources can include placing each such processor in a lowest power state, and preventing the processor from being used within the computer system. Such processors are capable of being placed in an active power state for active utilization by the computer system without rebooting of the computer system. Thus, a processor that is not currently being used can begin to be used without rebooting. Furthermore, for periodic usage resources, a timer is started, and the amount of time that has elapsed is periodically written into secure storage (I312). Similarly, for metered usage resources, a timer is started, and the amount of time that has elapsed is periodically written into secure storage and reported to the provider of the computer system (I313).

Once the computer system has been running, the user may request via a user interface, such as a graphical user interface or a command line interface, that one or more of the resources be converted from or into a metered usage resource (M302). As a result, these resources are set as metered (M304), generating a resource request 305. The directory of resources is parsed against this resource request 305 (M306), and, as before, like-licensing type resources are grouped together (M308). As appropriate, memory resources that are to be prevented from being used—i.e., metered resources that are being taken out of active usage availability—are disposed (M310), and likewise processors that are to be prevented from being used are disposed (M312). A timer for resources that are becoming metered is started and the amount of time that has elapsed is periodically written into secure storage and periodically reported to the provider (M314). The changes made to the metered resources are then communicated (M316), including notifying the provider so that the organization is appropriately charged (M318).

The user may further request via a user interface that one or more of the resources be converted from or into anytime usage resources (A302). These resources are set as anytime usage resources (A304), which generates a resource request 305. The directory of resources is parsed against this resource requested 305 (A306), and like-licensing type resources are grouped together (A308). As appropriate, memory resources that are to be prevented from being used—i.e., anytime resources that are being taken out of active usage availability—are disposed (A310), and likewise processors that are to be prevented from being used are disposed (A312). The changes made to the anytime usage resources are communicated (A314), including notifying the provider (A316).

Finally, the user may request via a user interface that one or more of the resources be converted from or into periodic usage resources (P302). These resources are set as periodic usage resources (P304), generating a resource request 305. The directory of resources is parsed against this resource request 305 (P306), and like-licensing type resources are grouped (P308). As appropriate, memory resources that are to be prevented from being used—i.e., periodic resources that are being taken out of active usage availability—are disposed (P310), and likewise processors that are to be prevented from being used are disposed (P312). A timer for resources that are becoming periodic is started, and the amount of time that has elapsed is periodically written into secure storage and periodically reported to the provider (P314). The changes made to the periodic usage resources are communicated (P316), including notifying the provider (P318).

At some point, metered and/or periodic usage resources may expire—that is, the computer system may determine that any of the resources licensed for metered and/or periodic usage have exceeded their utilization period (E302). When this occurs, where such resources are memory, the memory is disposed (E304), or where such resources are processors, the processors are disposed (E306), so that the resources are no longer available for active usage within the computer system, and thus are disabled. These changes are communicated (E308), including notifying the provider (E310).

Figure 4A:
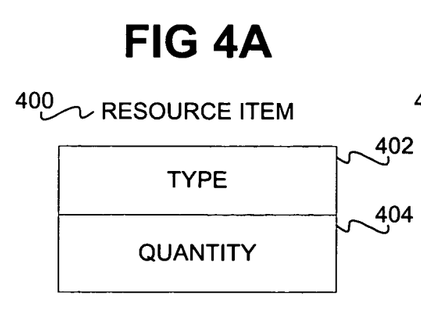
FIGS. 4A, 4B, 4C, and 4D are diagrams of data structures for managing computer system resources in accordance with licensing thereof, according to an embodiment of the invention.

FIGS. 4A, 4B, 4C, and 4D show different data structures 400, 410, 430, and 450, respectively, that can be used in conjunction with the method 300 of FIG. 3, according to an embodiment of the invention. A resource item data structure 400 is depicted in FIG. 4A. The data structure 400 is the structure that can be used to denote each resource within the computer system. The data structure 400 has a type field 402 and a quantity field 404. The type field 402 specifies the type of the resource, such as memory or a processor. The quantity field 404 indicates the number or amount of the resource, such as the amount of memory or the number of processors. The data structure 400 can be used in I302 of FIG. 3 when conducting an inventory of the resources of the computer system, such that an instance of the data structure 400 is created for each resource.

Figure 4B:
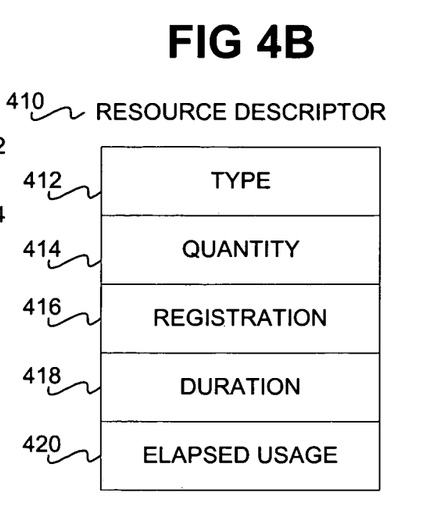

A resource descriptor data structure 410 is depicted in FIG. 4B. The data structure 410 is the structure that can be used to denote the licensing terms or type of each resource within the computer system. As such, the data structure 410 includes a type field 412 and a quantity field 404, which are the same as the type field 402 and the quantity field 404 of the data structure 400 of FIG. 4A. Furthermore, the data structure 410 includes a registration field 416, a duration field 418, and an elapsed usage field 420. The registration field 416 indicates whether the resource is metered, whether the resource is registered (i.e., whether the resource is non-metered resource), and/or whether the resource is unregistered (i.e., whether the resource is not licensed for usage).

The duration field 418 indicates whether the resource is a periodic usage or an anytime usage resource, where either type of resource can also be a metered resource. The elapsed usage field 420 is where how long the resource has been available for usage is stored, in the case of a metered and/or periodic usage resource. The data structure 410 can be used in I304 of FIG. 3, where a directory of resources may first be created before parsing by creating an instance of the data structure 410 for each resource represented by an instance of the data structure 400.

Figure 4C:
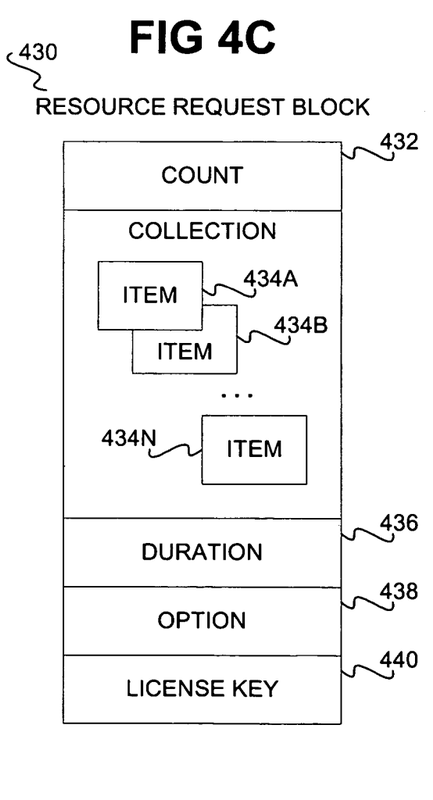

A resource request block data structure 430 is depicted in FIG. 4C. The data structure 430 is the structure that can be used to change the licensing terms or type of one or more resources within the computer system. The data structure 430 includes a count field 432, which is the number of resources affected by the request. A collection field is made up of a number of resource item instances 434A, 434B, . . . , 434N, collectively referred to as the resource item instances 434, and each of which is an instance of the resource item data structure 400 of FIG. 4A. The resource item instances 434 particularly describe the resources affected by the request.

The data structure finally includes a duration field 436, an option field 438, and a license key field 440. The duration field 436 indicates whether the resources affected by the request are to become anytime usage resources or periodic usage resources. The purchase option field 438 indicates whether the resources are to become non-metered (i.e., registered) or metered resources. Finally, the license key field 440 includes the license key that is entered by the user of the organization, as received from the provider of the computer system, to effectuate the change represented by the resource request block data structure 430. The data structure 430 can be the resource request 305 of FIG. 3 in one embodiment of the invention.

Figure 4D:
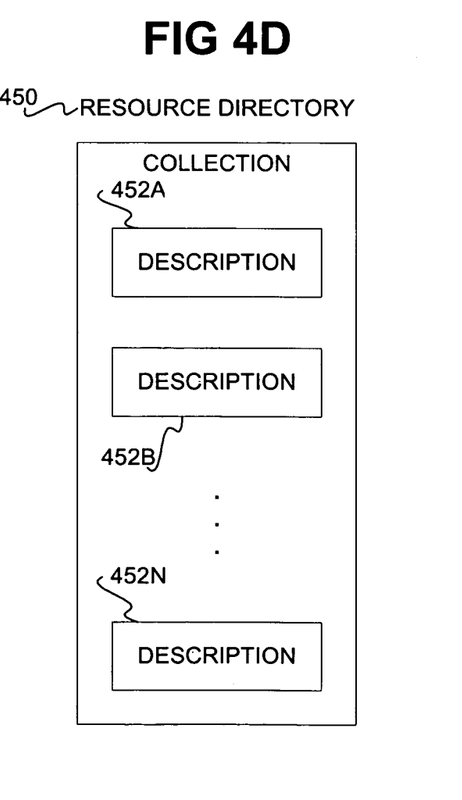

Finally, a resource directory data structure 450 is depicted in FIG. 4D. The data structure 450 is the structure that can be used to specify all the resources within a computer system, including their licensing types or terms. As such, the data structure includes a collection of resource descriptor instances 452A, 452B, . . . , 452N, collectively referred to as the resource descriptor instances 452. Each of the resource descriptor instances 452 is an instance of the resource descriptor data structure 410 of FIG. 4B. An instance of the data structure 450 can be the directory that is created and parsed in I304 and stored in the secure storage 303 of FIG. 3.

Embodiments of the invention have thus far been described in relation to the computer system 200. The computer system 200 is located at a client or a customer of a provider. It is the provider that provides the computer system 200 to its client or customer. Thus, the computer system 200 periodically reports back usage information of its resources to a computer system of the provider, so that the provider can appropriately account for such usage and correspondingly bill the client or customer.

Figure 5:
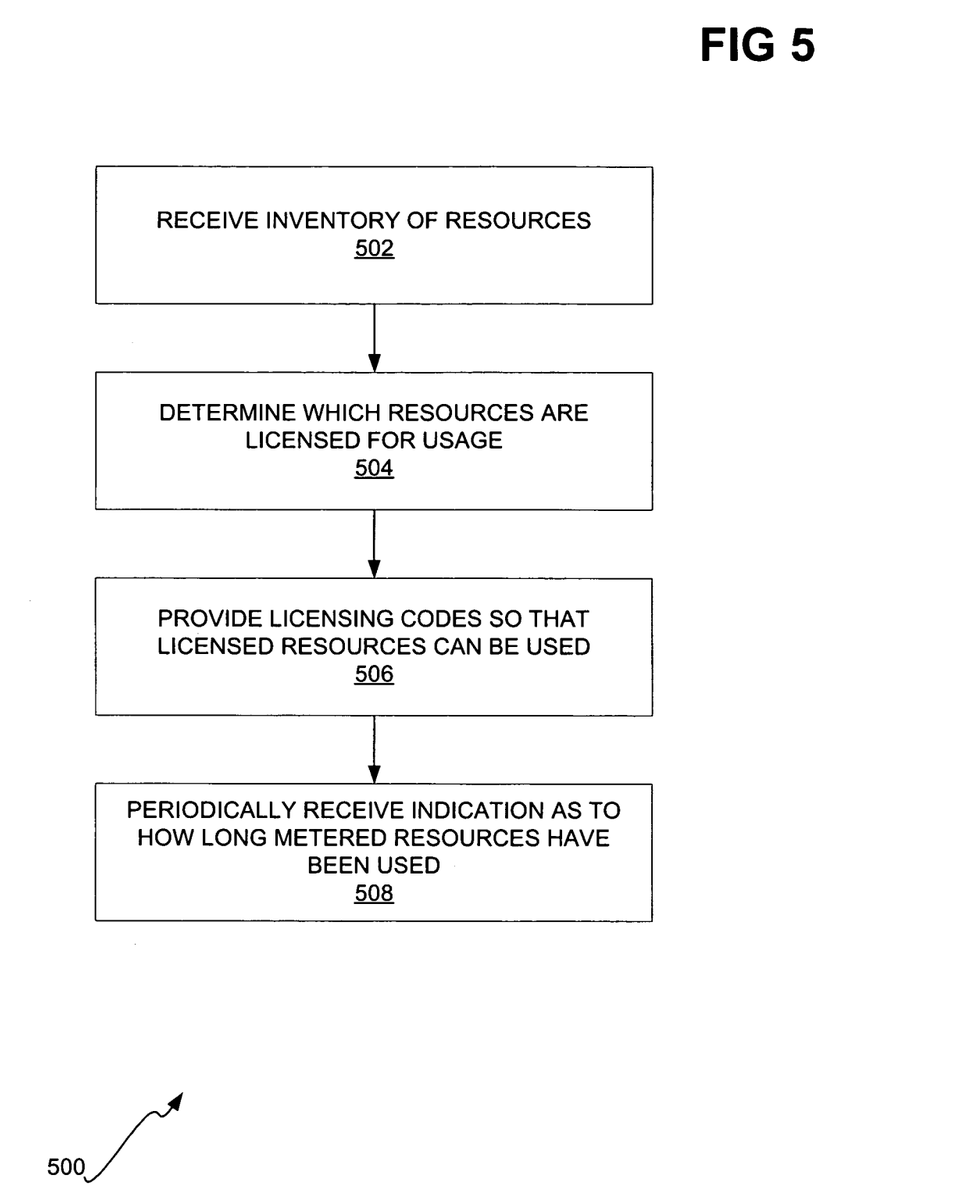
FIG. 5 is a flowchart of a method for permitting utilization of computer system resources in accordance with licensing thereof, as performed by a provider computer system in relation to a client computer system, according to an embodiment of the invention.

Therefore, FIG. 5 shows a method 500 that is performable by a computer system of a provider of the computer system 200, according to an embodiment of the invention. The method 500 is the counterpart method to the methods that have been described that are performable at the computer system 200. First, the provider computer system receives an inventory of resources of the computer system 200 (502), as taken by the computer system 200. The inventory may be sent by the computer system 200 to the provider computer system over a network.

Next, the provider computer system determines which of the resources are licensed for usage (504), based on, for instance, contracts that have been signed between the provider and the client or the customer, and so on. The provider computer system can determine which of the resources are licensed for usage with metering, which of the resources are licensed for anytime usage without metering, and which of the resources are licensed for periodic usage, such as seasonal usage, with or without metering.

The provider computer system then sends to the computer system 200 one or more licensing codes so that the resources that are licensed for usage are permitted to be utilized at the system 200, and the other resources are not permitted to be utilized (506). The provider computer system may send these codes to the computer system 200 over a network, for instance. The licensing codes are used by the computer system 200 to unlock the resources thereof that have been licensed, so that they may be utilized in accordance with their licensing terms.

Furthermore, for resources that are metered, such that the client or customer pays for usage of the resources in accordance with how long they are used, the provider computer system periodically receives indication from the computer system 200 as to how long these resources have been used (508). Such information is then used by the provider computer system to determine how much to bill the client or the customer that has been provided the computer system 200.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. A method comprising:
    as initialization, performing:
        conducting, by a processor, an inventory of resources within a computer system, to build a directory of the resources;
        after conducting the inventory, parsing the directory, by the processor, to determine a license type of each resource, as one of a plurality of license types including an unlicensed license type, a metered usage license type, and a periodic usage license type;
        after parsing the directory, grouping, by the processor, the resources of each license type within a resource group, to yield a plurality of resource groups corresponding to the license types, the resource group corresponding to the unlicensed license type comprising a processor resource and a memory resource;
        after grouping the resources, disposing, by the processor, each resource within the resource group corresponding to the unlicensed license type to prevent usage thereof;
        after grouping the resources, starting, by the processor, a first timer corresponding to the metered usage license type;
        after grouping the resources, starting, by the processor, a second timer corresponding to the periodic usage license type;
    in response to determining, by the processor, that a first given resource of the resources that have the metered usage license type has expired in consideration of the first timer, disposing the first given resource, by the processor, to prevent usage thereof;
    in response to determining, by the processor, that a second given resource of the resources that have the periodic usage license type has expired in consideration of the second timer, disposing the second given resource, by the processor, to prevent usage thereof;

placing the processor resource of the resource group corresponding to the unlicensed license type in a lowest power state to prevent the processor resource from being used within the computer system; and
    placing the memory resource of the resource group corresponding to the unlicensed license type in a list of unregistered memory of the computer system to prevent usage of the memory resource within the computer system.

2. The method of claim 1, wherein the metered usage license type specifies that a party licensing a corresponding resource is charged for a length of time that the party uses the corresponding resource, and the party is not charged for any length of time that the party does not use the corresponding resource.

3. The method of claim 1, wherein the periodic usage license type specifies that a party licensing a corresponding resource is permitted to use the corresponding resource during a predetermined time period and not outside the predetermined time period.

4. The method of claim 1, wherein the plurality of license types further include a periodic and unmetered usage license type specifying that a party licensing a corresponding resource is permitted to use the corresponding resource during a predetermined time period without being charged for a length of time that the party uses the corresponding resource during the predetermined time period, and is not permitted to use the corresponding resource outside the predetermined time period.

5. The method of claim 1, wherein the plurality of license types further include a periodic and metered usage license type specifying that a party licensing a corresponding resource is permitted to use the corresponding resource during a predetermined time period and the party is charged for a length of time that the party uses the corresponding resource during the predetermined time period, and is not permitted to use the corresponding resource outside the predetermined time period.

6. A non-transitory storage device storing a computer program executable by a processor to perform a method comprising:
    as initialization, performing:
        conducting an inventory of resources within a computer system, to build a directory of the resources;
        after conducting the inventory, parsing the directory to determine a license type of each resource, as one of a plurality of license types including an unlicensed license type, a metered usage license type, and a periodic usage license type;
        after parsing the directory, grouping the resources of each license type within a resource group, to yield a plurality of resource groups corresponding to the license types, the resource group corresponding to the unlicensed license type comprising a processor resource and a memory resource;
        after grouping the resources, disposing each resource within the resource group corresponding to the unlicensed license type to prevent usage thereof;
        after grouping the resources, starting a first timer corresponding to the metered usage license type;
        after grouping the resources, starting a second timer corresponding to the periodic usage license type;
    in response to determining that a first given resource of the resources that have the metered usage license type has expired in consideration of the first timer, disposing the first given resource to prevent usage thereof;
    in response to determining that a second given resource of the resources that have the periodic usage license type has expired in consideration of the second timer, disposing the second given resource to prevent usage thereof;

placing the processor resource of the resource group corresponding to the unlicensed license type in a lowest power state to prevent the processor resource from being used within the computer system; and placing the memory resource of the resource group corresponding to the unlicensed license type in a list of unregistered memory of the computer system to prevent usage of the memory resource within the computer system.

7. The non-transitory storage device of claim 6, wherein the metered usage license type specifies that a party licensing a corresponding resource is charged for a length of time that the party uses the corresponding resource, and the party is not charged for any length of time that the party does not use the corresponding resource.

8. The non-transitory storage device of claim 6, wherein the periodic usage license type specifies that a party licensing a corresponding resource is permitted to use the corresponding resource during a predetermined time period and not outside the predetermined time period.

9. The non-transitory storage device of claim 6, wherein the plurality of license types further include a periodic and unmetered usage license type specifying that a party licensing a corresponding resource is permitted to use the corresponding resource during a predetermined time period without being charged for a length of time that the party uses the corresponding resource during the predetermined time period, and is not permitted to use the corresponding resource outside the predetermined time period.

10. The non-transitory storage device of claim 6, wherein the plurality of license types further include a periodic and metered usage license type specifying that a party licensing a corresponding resource is permitted to use the corresponding resource during a predetermined time period and the party is charged for a length of time that the party uses the corresponding resource during the predetermined time period, and is not permitted to use the corresponding resource outside the predetermined time period.

11. A computer system comprising:
   a plurality of resources, including a processor and a storage device;
   a computer program stored on the storage device and executable by the processor to:
      as initialization, perform:
         conduct an inventory of the resources to build a directory of the resources;
         after conducting the inventory, parse the directory to determine a license type of each resource, as one of a plurality of license types including an unlicensed license type, a metered usage license type, and a periodic usage license type;
         after parsing the directory, group the resources of each license type within a resource group, to yield a plurality of resource groups corresponding to the license types, the resource group corresponding to the unlicensed license type comprising a processor resource and a memory resource;
         after grouping the resources, dispose each resource within the resource group corresponding to the unlicensed license type to prevent usage thereof;
         after grouping the resources, start a first timer corresponding to the metered usage license type;
         after grouping the resources, start a second timer corresponding to the periodic usage license type;
         in response to determining that a first given resource of the resources that have the metered usage license type has expired in consideration of the first timer, dispose the first given resource to prevent usage thereof;
         in response to determining that a second given resource of the resources that have the periodic usage license type has expired in consideration of the second timer, dispose the second given resource to prevent usage thereof;
         place the processor resource of the resource group corresponding to the unlicensed license type in a lowest power state to prevent the processor resource from being used within the computer system; and
         place the memory resource of the resource group corresponding to the unlicensed license type in a list of unregistered memory of the computer system to prevent usage of the memory resource within the computer system.

12. The computer system of claim 11, wherein the metered usage license type specifies that a party licensing a corresponding resource is charged for a length of time that the party uses the corresponding resource, and the party is not charged for any length of time that the party does not use the corresponding resource.

13. The computer system of claim 11, wherein the periodic usage license type specifies that a party licensing a corresponding resource is permitted to use the corresponding resource during a predetermined time period and not outside the predetermined time period.

14. The computer system of claim 11, wherein the plurality of license types further include a periodic and unmetered usage license type specifying that a party licensing a corresponding resource is permitted to use the corresponding resource during a predetermined time period without being charged for a length of time that the party uses the corresponding resource during the predetermined time period, and is not permitted to use the corresponding resource outside the predetermined time period.

15. The computer system of claim 11, wherein the plurality of license types further include a periodic and metered usage license type specifying that a party licensing a corresponding resource is permitted to use the corresponding resource during a predetermined time period and the party is charged for a length of time that the party uses the corresponding resource during the predetermined time period, and is not permitted to use the corresponding resource outside the predetermined time period.

* * * * *